United States Patent Office — 2,903,460 — Patented Sept. 8, 1959

2,903,460
PYRAZOLONE DERIVATIVES

Ernst Jucker, Binningen, and Anton Ebnöther and Adolf J. Lindenmann, Basel, Switzerland, assignors to Sandoz A.G., Basel, Switzerland No Drawing. Application December 9, 1958
Serial No. 779,073

Claims priority, application Switzerland April 7, 1956

8 Claims. (Cl. 260—294)

The present invention relates to new and therapeutically useful pyrazolone derivatives.

The new pyrazolone derivatives of the present invention correspond to the formula

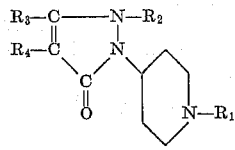
(I)

wherein $R_1$ represents lower alkyl (e.g. ethyl, propyl, etc., but preferably methyl), $R_2$ represents H or lower alkyl, each of $R_3$ and $R_4$ represents H, lower alkyl, lower alkenyl (e.g. propenyl, isopropenyl, butenyl, etc., but preferably allyl), lower alkynyl (e.g. propynyl, etc., but preferably prop-2′-ynyl), phenyl, benzyl, nitrophenyl, chlorophenyl or methylphenyl, or, taken together, $R_3+R_4$ represent —$CH_2$—$CH_2$—$CH_2$—.

A special sub-group of the new pyrazolone derivatives of this invention correspond to the formula

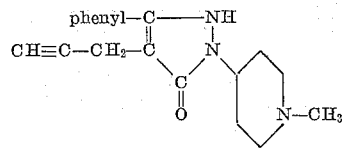
(II)

wherein the phenyl group may be suitably substituted, advantageously by a chlorine atom or a methyl group. These compounds which may be present in isomeric form:

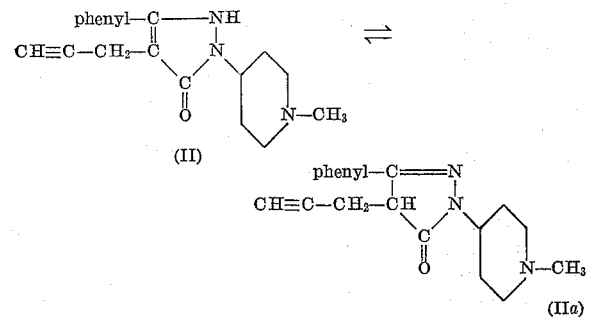
(II)
(IIa)

can advantageously be prepared by reacting the corresponding N-methyl-piperidyl-4-hydrazine of the formula

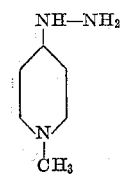
(III)

with a corresponding β-ketocarboxylic acid or with a reactive derivative thereof of the formula

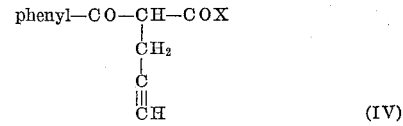
(IV)

wherein the phenyl group may be substituted as in Formula II, and X stands for a hydroxy group or an alkoxy group containing 1 to 2 carbon atoms. Thus, for example, the N-methyl-piperidyl-4-hydrazine of Formula III is admixed at room temperature (20 to 30° C.) with a β-keto-carboxylic acid ester of Formula IV. The mixture is warmed slightly. Alcohol which forms in the course of the ensuing condensation is removed from the reaction mixture by heating under reduced pressure. The reaction product may be purified by recrystallization.

The N-methyl-piperidyl-4-hydrazine of Formula III, which is employed as starting material, can be prepared for example by the condensation of the N-methyl-4-piperidone of the following formula

(V)

with a monoacyl-hydrazine, whereby the corresponding acylated 4-piperidone-hydrazone is formed, and by reducing the latter to the corresponding hydrazine derivative with the aid of catalytically activated hydrogen. By heating with aqueous mineral acid, the acyl group is then split off, yielding the N-methyl-piperidyl-4-hydrazine. Starting from a monoacyl-hydrazine (e.g. benzoyl-hydrazine) is absolutely necessary, because free hydrazine reacts with two molecules of the N-methyl-4-piperidone of Formula V.

A further sub-group of the new pyrazolone derivatives of this invention correspond to the Formula I supra, wherein $R_1$ is lower alkyl, $R_2$ is H or lower alkyl, and each of $R_3$ and $R_4$ is H, lower alkyl, lower alkenyl, phenyl, benzyl, nitrophenyl, chlorophenyl or methylphenyl or, taken together, $R_3+R_4$ are trimethylene.

These and the remaining compounds of Formula I can be prepared in essentially similar manner by reacting the corresponding piperidyl-4-hydrazine of the formula

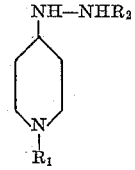
(VI)

wherein $R_1$ and $R_2$ have the previously indicated significances, with a β-keto acid or with a reactive derivative thereof of the formula

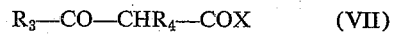

$$R_3\text{—CO—CHR}_4\text{—COX} \qquad (VII)$$

wherein $R_3$ and $R_4$ have the same significances as the Formula I, and X stands for a hydroxyl group, an alkoxy group containing 1 to 4 carbon atoms or a primary or secondary amino group, and if necessary or desirable separating resultant isomers from each other.

The preparation of pyrazolone derivatives by the reaction between β-ketocarboxylic acid esters and hydrazine or its monosubstitution products is known. Of the so-prepared pyrazolone derivatives, the 1-phenyl-3- methyl-pyrazolone-5 obtainable by the condensation of acetoacetic acid ester with phenylhydrazine is of particularly great importance since although it is itself pharmacologically inactive, it is the starting point for the preparation of a number of antipyretically and analgetically active medicinal agents, for example 1-phenyl-2,3-dimethyl-pyrazolone-5 and 1-phenyl-2,3-dimethyl-4-isopropyl-pyrazolone-5. All these known products, which differ but little from each other in their action, have in common the substitution of the pyrazolone ring by a phenyl nucleus in position 1.

The new pyrazolone derivatives of the present invention differ inter alia from prior known pyrazolones in that they carry a piperidine radical at the 1-position of the pyrazolone ring. The new derivatives are distinguished from the aforementioned known pyrazolone derivatives, which are prepared by the condensation of β-ketocarboxylic acid esters with hydrazine derivatives, in that the former themselves possess therapeutically valuable pharmacodynamic properties. The presence of a basic atom grouping in the molecule is of great significance in the new compounds, since they can be converted into water-soluble salts by means of acids. The new compounds are at room temperature (about 20° to about 30° C.) crystalline bases.

If, in the last aforedescribed process, the reaction is carried out between a hydrazine derivative which is substituted on one side only, i.e. piperidyl-4-hydrazine with a free, end-positioned amino group (Formula VI, $R_2=H$) and with the β-keto acid derivative, then the reaction proceeds uniformly, and a pyrazolone derivative is obtained which contains an NH-group as a ring member in position 2. On the other hand, when use is made of hydrazine derivatives which are substituted on both sides, the reaction can proceed in two directions so that two isomeric pyrazolone derivatives (Formulae VIIIa and VIIIb) can be obtained:

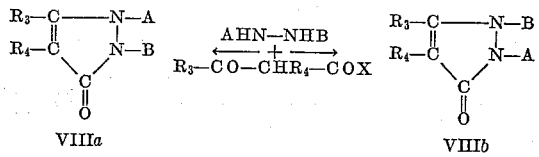

The products are obtained as mixtures which, if desired, can be separated into the two isomeric pyrazolone derivatives according to conventional methods, as for example by fractional crystallization of the end products and/or of appropriate derivatives thereof.

The last aforedescribed process of the present invention may be carried out for example as follows:

A piperidyl-4-hydrazine of Formula VI is admixed at room temperature with a β-keto acid ester of Formula VII. The mixture is warmed slightly. Alcohol which forms in the course of the ensuing condensation is removed from the reaction mixture by heating under reduced pressure. The reaction product may be purified, e.g. by fractionation in a high vacuum or by recrystallization. If the condensation tends to liberate too much heat, it is desirable to dilute the reaction partners by dissolving them in an inert solvent, e.g. benzene. In the event that the liberated alcohol is not distilled off as a result of the heat of reaction, removal can be effected by heating under reduced pressure, as already indicated.

The piperidyl-4-hydrazines of Formula VI, which are thus employed as starting materials, can be prepared, for example, by the condensation of a 4-piperidone of the following formula

(IX)

with a monoacyl-hydrazine, whereby the corresponding acylated 4-piperidone-hydrazone is formed, and by reducing the latter to the corresponding hydrazine derivative with the aid of catalytically activated hydrogen. By heating with aqueous mineral acid, the acyl group is then split off, yielding the piperidyl-4-hydrazine. The necessity of starting from a monoacyl-hydrazine applies only in the case of hydrazine itself, since free hydrazine reacts with two molecules of a 4-piperidone of Formula IX. However, even when employing a monoalkyl derivative of hydrazine, it is also possible—although by no means necessary—to use the corresponding acyl derivative.

The new pyrazolone derivatives of the present invention possess valuable pharmacodynamic properties. Thus, they have analgetic and antipyretic activity, coupled with very low toxicity. The invention comprises compounds which show a 1.5- to 2-fold greater analgetic and antipyretic activity than dimethylaminoantipyrine. In addition, the new compounds of the present invention exert an excellent temperature-reducing action, which equals or is superior to that of dimethylaminoantipyrine. In addition, the new compounds have a stronger narcosis-potentiating action than dimethylaminoantipyrine. Their slight toxicity, even upon chronic administration, and their consequent excellent tolerability, are particularly noteworthy. The precedingly-outlined properties of the new compounds render them well adapted for use in therapy, especially where analgesia and/or anti-pyresis are desired, as e.g. in combating pain and/or in reducing fever. In this connection, the convertibility of the new compounds into water-soluble salts with inorganic and organic acids is of great importance, since analgetically and antipyretically active pyrazolone derivatives are rendered available for therapy, the so-obtained derivatives being characterized by particularly good resorbability from e.g. tablets or other forms of administration per os. It thus also becomes easy to prepare highly concentrated aqueous solutions, e.g. ampoule solutions for parenteral administration, an expedient which is bound up with very great difficulties in connection with prior known pyrazolones.

A further advantage of the pyrazolones of the present invention is that, due to the presence of the N-(methyl-piperidyl-4')-radical in the 1-position, no poisonous aniline compounds are formed upon decomposition thereof, as is the case with dimethylaminoantipyrine which contains a phenyl group in the 1-position.

The new compounds are also useful as intermediates for the preparation of other medicinal agents.

In the illustrative examples which follow and which set forth present-preferred exemplary embodiments of the invention, the parts are by weight unless otherwise indicated. Percentages are also by weight. Temperatures are in degrees centigrade. Melting points are uncorrected. The relationship between parts by weight and parts by volume in these examples is the same as that between grams and milliliters.

EXAMPLE 1

An ethanolic solution of 27.2 parts of benzoylhydrazine and 22.6 parts of N-methyl-4-piperidone is heated to boiling for two hours, the mixture then evaporated under reduced pressure, and the residue recrystallized from benzene-ether. 34.6 parts of the so-obtained benzoylhydrazone of N-methyl-4-piperidone (melting point 146–147°) are then hydrogenated in glacial acetic acid at room temperature and at atmospheric pressure and in the presence of 0.40 part of pre-hydrogenated platinum oxide, yielding the corresponding benzoylhydrazine derivative. The latter is then hydrolyzed by heating to boiling with hydrochloric acid of 23% strength, yielding the N-methyl-piperidyl-4-hydrazine-dihydrochloride. From the salt, the free base is obtained by treatment with methanolic caustic potash solution; melting point of the free base, which is a colorless crystalline substance, is 66–70°/0.3 mm. Hg.

A mixture of 8.2 parts of α-benzoyl-propionic acid ethylester and 5.3 parts of the precedingly obtained N-methyl-piperidyl-4-hydrazine is allowed to stand for 45 minutes at room temperature, after which it is heated to 120° under a pressure of 12 mm. Hg for four hours, the resultant pyrazolone derivative beginning to crystallize out at the end of three hours. After it has cooled, the crystal mass is triturated with ether, filtered off, and the 1 - (N - methyl - piperidyl - 4') - 3 - phenyl - 4 - methyl - pyrazolone-5 recrystallized from methanol. Its melting point is 205–207° (decomposition).

Upon addition of the calculated quantity of 2.05-normal aqueous hydrobromic acid to a methanolic solution of the 1-(N-methyl-piperidyl-4')-3-phenyl-4-methyl-pyrazolone-5, the monohydrobromide is formed which, upon recrystallization from methanol-ether is obtained in the form of crystals which melt at 172–175° (decomposition).

The corresponding dihydrochloride is obtained by the addition of excess methanolic HCl to the free base. The melting point of the dihydrochloride is 219–222° (decomposition) after recrystallization from methanol-ether.

EXAMPLE 2

19.2 parts of N-methyl-4-piperidone and 8.0 parts of methyl-hydrazine are combined in ethanolic solution, with cooling. The mixture is then warmed to 60–65° for 40 minutes, 25 parts by volume of benzene are added, and the mixture evaporated under reduced pressure. The (N-methyl-4-piperidone)-methyl-hydrazone which is thus obtained as the residue is distilled under reduced pressure; boiling point 98–99°/11 mm. Hg.

10 parts of the hydrazone are then benzoylated with 10 parts of benzoyl chloride in chloroform solution. The resultant (N-methyl-4-piperidone)-methyl-benzoyl-hydrazone crystallizes from acetone in the form of parallelopipeds which melt at 96–102°. Hydrogenation of 4 parts of this benzoyl hydrazone in 110 parts by volume of glacial acetic acid in the presence of 0.080 part of pre-reduced platinum oxide at room temperature and at atmospheric pressure yields ω-(N-methyl-piperidyl-4)-ω'-methyl-benzoyl-hydrazine, which boils at 145–150°/0.3 mm. Hg, and which recrystallizes from ether-petroleum ether in the form of needles which melt at 70–76°. By heating the thus-obtained benzoyl derivative to boiling with hydrochloric acid of 23% strength, the ω-(N-methyl-piperidyl-4)-ω'-methyl-hydrazine-dihydrochloride is obtained in the form of colorless fine needles which melt at 187–210° (decomposition) after recrystallization from methanol-ether. The free base is obtained from the dihydrochloride by treatment with methanolic KOH, and boils at 60°/0.3 mm. Hg.

A mixture of 2 parts of ω-(N-methyl-piperidyl-4)-ω'-methyl-hydrazine and 2.64 parts of benzoylacetic acid ethylester is allowed to stand for 45 minutes at room temperature, after which it is heated to 130° for 6 hours under a pressure of 12 mm. Hg. After it has cooled, the obtained glass-like solidified mass is distilled under reduced pressure. The viscous oil which distils over between 160 and 185° under a pressure of 10⁻⁴ mm. Hg is dissolved in benzene and is then caused to crystallize out by the addition of petroleum ether. The so-obtained pyrazolone-5 derivative of benzoylacetic acid ethylester and ω-(N-methyl-piperidyl-4)-ω'-methyl-hydrazine melts at 120–122°, after being recrystallized from benzene-petroleum ether.

To prepare the monohydrobromide of the said pyrazolone-5 derivative, 0.89 part by volume of 2.05-normal aqueous hydrobromic acid is added to a solution of 0.494 part of the free base in 3 parts by volume of methanol. The methanol and water are then completely removed in vacuo, and the obtained crystalline residue is dried for 24 hours over phosphorus pentoxide at room temperature and under reduced pressure. The hydrobromide is then recrystallized from methanol-ether; it melts at 237–241° (decomposition).

The corresponding hydrochloride is obtained by adding the calculated quantity of methanolic HCl to the free base. Melting point of the hydrochloride, after recrystallization from methanol-ether, is 255–257° (decomposition).

EXAMPLE 3

A mixture of 2.86 parts of ω-(N-methyl-piperidyl-4)-ω'-methyl-hydrazine and 3.16 parts of α-isopropyl-acetoacetic acid ester is heated to 160° for 6 hours in a nitrogen atmosphere, and then to 200° for five more hours. The resultant viscous reaction mixture is distilled under a pressure of 0.04 mm. Hg. The fraction going over from 100° to 170° is again distilled under the same pressure, whereupon at first a small quantity of substance sublimes at 100–120° as needle-like crystals. The principal fraction passes over between 120° and 140° as a viscous yellow oil. A solution of the latter in 7.8 parts by volume of 1.282-normal hydrochloric acid is evaporated, and the obtained foamy residue is dissolved in acetone. After a short time, the hydrochloride of the pyrazolone-5 derivative (from α-isopropyl-acetic acid ester and ω-(N-methyl-piperidyl-4)-ω'-methyl-hydrazine) crystallizes out in the form of needles which, after two recrystallizations from chloroform-acetone, are analytically pure and melt at 254–258° (decomposition).

EXAMPLE 4

A solution of 6.4 parts of N-methyl-piperidyl-4-hydrazine in 5 parts by volume of benzene is added dropwise at room temperature to 9.6 parts of benzoylacetic acid ethyl ester. The mixture becomes warm on standing, until in a few minutes a violent reaction takes place, during which the benzene and the ethanol formed during the condensation distil off, and the 1-(N-methyl-piperidyl-4')-3-phenyl-pyrazolone-5 crystallizes out. After standing for two hours, the pyrazolone derivative is triturated with ether, filtered off and recrystallized from ethanol; melting point 221–224° (decomposition).

To prepare the monohydrobromide, 7.58 parts by volume of 2.05-normal aqueous hydrobromic acid are added to a solution of 4 parts of the 1-(N-methyl-piperidyl-4')-3-phenyl-pyrazolone-5 in 5 parts by volume of methanol, after which the methanol and water are completely removed in vacuo and the obtained crystalline residue is dried over phosphorus pentoxide for 24 hours under reduced pressure and at room temperature. The so-obtained salt is triturated with ether, filtered and recrystallized from methanol-ether. The resultant hygroscopic 1 - (N-methyl-piperidyl-4')-3-phenylpyrazolone-5-monohydrobromide melts at 230–233° (decomposition).

The corresponding dihydrochloride is obtained by adding an excess of methanolic HCl to 1-(N-methyl-piperidyl-4')-3-phenyl-pyrazolone-5; melting point of the dihydrochloride is 210° (decomposition) after recrystallization from methanol-ether.

EXAMPLE 5

10.4 parts of acetoacetic acid ether are added dropwise in the course of 20 minutes to a solution of 12.9 parts of N-methyl-piperidyl-4-hydrazine in 125 parts by volume of benzene. After the mixture has stood for one hour at room temperature, the benzene is distilled off, and the residue is heated to 100° for 30 minutes. Finally, last traces of benzene are removed under reduced pressure, and the residue is dissolved in 25 parts by volume of ethyl acetate. 1-(N-methyl-piperidyl-4')-3-methyl-pyrazolone-5 crystallizes out; after two recrystallizations from ethyl acetate, it melts at 146–147°.

Upon adding the calculated quantity of 2.05-normal aqueous hydrobromic acid to a methanolic solution of the so-obtained free base, the monohydrobromide of the latter is obtained. After recrystallization thereof from methanol-ether, the monohydrobromide is obtained as needles which melt at 218–222°.

EXAMPLE 6

7 parts of N-methyl-piperidyl-4-hydrazine and 8.6 parts of α-isopropyl-acetoacetic acid ester are admixed at room temperature. The mixture warms up slightly, and at the end of 30 minutes has become viscous. The mass is heated to 120° for 5 hours at a pressure of 12 mm. Hg, after which the dark-colored reaction product is distilled in a high vacuum. A yellow oil, which immediately solidifies in the cold, passes over at 130–160° under a pressure of 0.1 mm. Hg. Several drops of water are added to a solution of this oil in ether, whereupon 1-(N-methyl-piperidyl-4')-3-methyl-4-isopropyl-pyrazolone-5 crystallizes out as the monohydrate; after two recrystallizations from ethyl acetate, it is obtained in the form of fine prisms which melt at about 90°.

EXAMPLE 7

7.1 parts of N-methyl-piperidyl-4-hydrazine and 9.3 parts of α-n-butyl-acetoacetic acid ester are admixed at room temperature. The mixture becomes very warm. After the lapse of one hour, the mass is heated for 5 hours to 120° under a pressure of 12 mm. Hg, the viscous slightly brownish reaction product is dissolved in ether, and petroleum ether is added dropwise to the solution. 1-(N-methyl-piperidyl-4')-3-methyl-4-n-butyl-pyrazolone-5 crystallizes out. The compound is hygroscopic and is converted in air to the monohydrate. For purification of the product, it is distilled in a high vacuum, whereupon it passes over at 130–150° under a pressure of 0.1 mm. Hg. After recrystallization, first from ether-petroleum ether and then from ether by the dropwise addition of water, the monohydrate is obtained in the form of dense prisms which melt at 75–85°.

EXAMPLE 8

7.1 parts of N-methyl-piperidyl-4-hydrazine and 8.6 parts of α-n-propyl-acetoacetic acid ester are admixed, whereupon the mixture becomes very warm. The mass is then heated for four hours to 120° under a pressure of 12 mm. Hg. The reaction product is dissolved in ether. After a short time, 1-(N-methyl-piperidyl-4')-3-methyl-4-n-propyl-pyrazolone-5 crystallizes out; after two recrystallizations, it is obtained as hygroscopic platelets which melt at 110–112°.

EXAMPLE 9

7.1 parts of N-methyl-piperidyl-4-hydrazine and 10.3 parts of α-phenyl-acetoacetic acid ester are mixed together, the mixture becoming warm. The mixture is then heated for 10 minutes to 120° under a pressure of 12 mm. Hg, whereupon crystallization takes place. After recrystallization from methanol, the obtained 1-(N-methyl-piperidyl-4')-3-methyl-4-phenyl-pyrazolone-5 melts at 220–227°.

EXAMPLE 10

A mixture of 8.8 parts of α-ethyl-benzoyl-acetic acid ethylester and 5.3 parts of N-methyl-piperidyl-4-hydrazine is allowed to stand for 30 minutes at 22°, after which the mixture is heated for 5 hours to 130° under a pressure of 12 mm. Hg. After four hours, 1-(N-methyl-piperidyl-4')-3-phenyl-4-ethyl-pyrazolone-5 begins to crystallize out. The reaction mixture is allower to cool, after which the crystal mass is triturated with ether and then recrystallized from methanol-ether or from acetone. Melting point=159–161°.

EXAMPLE 11

5 parts of N-methyl-piperidyl-4-hydrazine and 5 parts of α-methyl-acetoacetic acid ester are admixed at room temperature. The mixture warms up slightly and becomes viscous. After 30 minutes, the mass is heated for 1 hour to 120° under a pressure of 12 mm. Hg, and then the weakly yellowish reaction product is dissolved in ethyl acetate, whereupon 1-(N-methyl-piperidyl-4')-3,4-dimethyl-pyrazolone-5 immediately crystallizes out. After two recrystallizations from ethyl acetate, the compound is obtained in the form of dense hygroscopic crystals which melt at 145–152°, after sintering strongly at about 90°.

EXAMPLE 12

2.84 parts (10% excess) of N-methyl-piperidyl-4-hydrazine and 3.16 parts of α-ethyl-acetoacetic acid ester are admixed. The mixture warms up slightly and becomes viscous. After 30 minutes, the reaction product is heated for 1 hour to 120° at 12 mm. Hg pressure and then, after being cooled, is dissolved in ether, whereupon 1-(N-methyl-piperidyl-4')-3-methyl-4-ethyl-pyrazolone-5 crystallizes out. Upon recrystallization from ethyl acetate or acetone, the said pyrazolone derivative is obtained in the form of hygroscopic crystals which sinter strongly at about 70° with liberation of water of crystallization and melt at 110–125°.

EXAMPLE 13

5.68 parts (10% excess) of N-methyl-piperidyl-4-hydrazine and 7.68 parts of α-formyl-phenylacetic acid ethylester are admixed, the mixture becoming warm. After ten minutes, the mass is heated to 100° under a pressure of 12 mm. Hg. In a short time, the reaction product separates out in crystalline form. The so-obtained 1-(N-methyl-piperidyl-4')-4-phenyl-pyrazolone-5 is crystallized out of methanol; it decomposes slowly above 200° and melts at a temperature up to about 240°, depending upon the speed of heating and the crystal size.

The so-obtained compound is dissolved in the quantity of aqueous hydrochloric acid calculated for the formation of the monohydrochloride, after which the solution is evaporated and the residue recrystallized from ethanol and then from methanol-ether. The monohydrochloride is thus obtained in the form of dense hydroscopic prisms which melt at about 230–240° (decomposition).

EXAMPLE 14

5.67 parts of N-methyl-piperidyl-4-hydrazine and 8.8 parts of α-propionyl-phenylacetic acid ethylester are admixed, and after a short time the mixture is warmed on the water-bath, whereupon a vigorous reaction takes place. The mass is further heated for 15 minutes at 120° under a pressure of 12 mm. Hg, after which the reaction product is triturated with a large quantity of ether, whereupon crystallization takes place. The so-obtained 1-(N-methyl-piperidyl-4')-3-ethyl-4-phenyl-pyrazolone-5 is recrystallized from isopropanol; melting point about 188–194° (decomposition).

In order to prepare the monohydrochloride, the free base is dissolved in the calculated quantity of aqueous hydrochloric acid, and the solution evaporated. After recrystallization from ethanol-acetone and then from isopropanol, the monohydrochloride is obtained as long hygroscopic needles which melt at 238–345° (decomposition).

EXAMPLE 15

34 parts of well dried sodium ethylate are thoroughly stirred into a mixture of 58 parts of butyric acid ethylester and 58.5 parts of benzyl cyanide. Stirring is effected for ½ hour with ice-cooling, then for ½ hour at room temperature, and finally for ½ hour at 100°. After cooling, the reaction product is dissolved in water, and then shaken with ether in order to remove small quantities of unchanged starting material. The aqueous layer is acidified, the precipitated nitrile taken up in ether, the ethereal solution washed with aqueous sodium chloride solution, dried over magnesium sulfate and evaporated. The residue is distilled, and the fraction passing over at 107–124° under a pressure of 0.1 mm. Hg is collected and again distilled. The so-obtained α-butyryl- α-phenyl-acetonitrile boils at 107–113° under a pressure of 0.1 mm. Hg; $n_D^{23}=1.5261$.

A solution of 38 parts of the so-obtained α-butyryl-α-phenyl-acetonitrile in 40 parts by volume of ethanol is saturated with hydrogen chloride while cooling with ice. After standing for 20 hours at room temperature, the solution is evaporated at 30–40° under reduced pressure. 50 parts by volume of ethanol and 50 parts by volume of water are then added to the residue, after which the obtained solution is slowly heated to 40° C. After about 5 minutes, an oil separates from the clear solution; after some time this oil is taken up in ether. The ethereal solution is washed with aqueous sodium chloride solution, dried over magnesium sulfate and evaporated. The residue from this evaporation is distilled under reduced pressure, and the main fraction which passes over at 111–113° under a pressure of 0.2 mm. Hg is again distilled. The so-obtained α-butyryl-phenylacetic acid ethylester boils at 100–103°/0.08 mm. Hg; $n_D^{23}=1.5071$.

A mixture of 11.7 parts of the thus-prepared α-butyryl-phenylacetic acid ethylester and 7.1 parts of N-methyl-piperidyl-4-hydrazine (10% excess) is heated for a short time on the water-bath, whereupon a vigorous reaction takes place. The mass is then heated to 120° for 15 minutes under a pressure of 12 mm. Hg, after which the reaction product is dissolved in ether. After standing for some time, 1-(N-methyl-piperidyl-4')-3-propyl-4-phenyl-pyrazolone-5 crystallizes out as very fine prisms. The hygroscopic compound is recrystallized once from ethyl acetate-ether and twice from ethyl acetate alone. Treatment with hydrogen chloride, after the manner described in the preceding two examples, yields the monohydrochloride which crystallizes from isopropanol in the form of very fine needles which melt at 240–250° (decomposition).

EXAMPLE 16

*1 - (N - methyl - piperidyl - 4') - 2,3 - dimethyl - 4 - isopropyl-pyrazolone-5 and 1,3-dimethyl-2-(N-methyl-piperidyl-4')-4-isopropyl-pyrazolone-5*

A mixture of 24.5 parts of ω-(N-methyl-piperidyl-4)-ω'-methyl-hydrazine (10% excess) and 27 parts of α-isopropyl-acetoacetic acid ester is heated for 2 hours at 160° and then 5½ hours at 200° in a nitrogen atmosphere. After cooling, the reaction mass is dissolved in ether and the solution filtered. After evaporation of the ether solution, the obtained residue is distilled under a pressure of 0.1 mm. Hg, and the viscous oil which goes over between 130° and 170° is collected and dissolved in 57.7 parts by volume of 2-normal hydrochloric acid. The solution is evaporated to dryness and the residue dissolved in acetone, whereupon a monohydrochloride crystallizes out in a short time. The monohydrochloride is filtered off and recrystallized from chloroform-acetone and then, for purification, it is again converted into the free base. The latter is distilled and then again converted into the monohydrochloride which, after recrystallization from chloroform-acetone, is obtained in the form of hygroscopic needles which melt at 254–259°.

From the combined mother liquors, the bases are liberated with the aid of aqueous potassium carbonate solution and are then extracted with ether. The dried chloroform solution is then evaporated, and the residue again distilled at 0.1 mm. Hg pressure. The oily distillate is dissolved in the quantity of aqueous hydrobromic acid calculated to produce the monohydrobromide, the solution evaporated and the dried residue taken up in acetone. The crude monohydrobromide which crystallizes out yields, upon fractional crystallization from isopropanol-acetone-ether 1:1:1 a pure unitary monohydrobromide which melts at 215–219° (decomposition). This hydrobromide can be converted into the corresponding monohydrochloride which is very hygroscopic and is not identical with the first mentioned monohydrochloride which melts at 254–259°.

To increase the yield, the mother liquors can be again subjected to the separation procedure by way of the hydrochloride and then by way of the hydrobromide.

EXAMPLE 17

*Pyrazolone-5 derivative from α-ethyl-acetoacetic acid ester and ω-(N-methyl-piperidyl-4)-ω'-methyl-hydrazine*

7.82 parts of ω-(N-methyl-piperidyl-4)-ω'-methyl-hydrazine (10% excess) and 7.82 parts of α-ethyl-acetoacetic ester are mixed together and then heated to 160° for two hours, about 2.5 parts by volume of ethanol and water distilling off. Thereupon the reaction mass is heated further, in a nitrogen atmosphere, to 180° for two hours and to 200° for 3 hours. The dark-colored reaction product is dissolved in ether, the ethereal solution filtered to separate any precipitated crystalline material, and evaporated. The so-obtained residue is distilled under reduced pressure, and the fraction passing over from 235° to 160° under a pressure of 0.08 mm. Hg is collected as a weakly yellow oil which is then dissolved in 20 parts by volume of 2-normal aqueous hydrobromic acid. Upon evaporation of the resultant solution, the residue crystallizes out; it is digested with boiling acetone whereupon, after two recrystallizations from isopropanol, there are obtained hygroscopic crystals of a monohydrobromide which melts at 230–235° (decomposition).

The mother liquors contain the second isomeric pyrazolone derivative.

EXAMPLE 18

6.45 parts of N-methyl-piperidyl-4-hydrazine and 8.6 parts of α-propionyl-n-butyric acid ethylester are mixed together at room temperature, after which the mixture is warmed for a short time on the water-bath. After keeping the mixture for ½ hour at room temperature, it is heated for 1½ hours at 120° under a pressure of 12 mm. Hg. The reaction mixture is then distilled under a pressure of 0.07 mm. Hg, whereupon a light-yellow viscous oil passes over as the principal fraction at a bath temperature of 140–170°. This distillate is dissolved in 20.5 parts by volume of 2.05-normal aqueous hydrobromic acid and the solution is evaporated; the so-obtained residue is dissolved in 15 parts by volume of isopropanol, after which acetone is slowly added until incipient clouding. The 1-(N-methyl-piperidyl-4')-3,4-diethyl-pyrazolone-5-hydrobromide crystallizes out; after recrystallization from isopropanol-ether, it melts at 120–126°, after sintering from above about 116°.

EXAMPLE 19

A mixture of 7.1 parts of N-methyl-piperidyl-4-hydrazine (10% excess) and 10.0 parts of α-n-valeryl-n-butyric acid ethylester is heated first for 15 minutes on the water-bath and then 2½ hours at 120° under a pressure of 12 mm. Hg. The reaction product is distilled under a pressure of 0.1 mm. Hg the fraction going over as a viscous yellow oil between 120° and 180° being collected. This distillate is dissolved in 17.7 parts by volume of 2.05-normal aqueous hydrobromic acid, the solution evaporated, and the residue dissolved in boiling acetone. Upon cooling, 1-(N-methyl-piperidyl-4')-3-n-butyl-4-ethyl-pyrazolone-hydrobromide crystallizes out as platelets which immediately disintegrate upon standing in air. After recrystallization from acetone, the substance takes up 3 molecules of water upon standing in air and then melts unsharply at 50–75°.

EXAMPLE 20

7.1 parts of N-methyl-piperidyl-4-hydrazine (10% excess) and 7.8 parts of cyclopentanone-α-carboxylic acid ethylester are mixed together, whereupon the mixture warms up slightly. After 30 minutes, the mixture is heated under a pressure of 12 mm. Hg first to 120° for 2 hours and then to 180° for 3 hours. The mass is allowed to cool, and then the viscous reaction product is dissolved in 10 parts by volume of ethyl acetate. In a short time, 1-(N-methyl-piperidyl-4')-3,4-cyclotrimethylene-pyrazolone-5 crystallizes out. The mother liquor is evaporated, and the residue is distilled under a pressure of 0.1 mm. Hg, the fraction passing over as a viscous oil at a bath temperature of 190–250° being collected. This fraction which partially crystallizes upon cooling, yields a further quantity of the pyrazolone upon crystallization from ethyl acetate-ether. 1-(N-methyl-piperidyl-4')-3,4-cyclotrimethylene-pyrazolone-5 melts at 190–194° (with sintering above 187°) after being twice recrystallized from benzene.

EXAMPLE 21

7.0 parts of N-methyl-piperidyl-4-hydrazine and 11.3 parts of α-benzoyl-valerianic acid ethylester are mixed together at room temperature. After 30 minutes, the mixture is heated for 4 hours to 130° and then kept for one more hour at 150° under a pressure of 12 mm. Hg. After cooling, the viscous mass is dissolved in a small quantity of benzene, and crystallization caused to take place by the addition of petroleum ether. Upon recrystallization from benzene-petroleum ether, the obtained 1 - (N - methyl-piperidyl - 4') - 3 - phenyl - 4 - n-propyl-pyrazolone-5 melts at 155–156°.

EXAMPLE 22

5.0 parts of N-n-butyl-piperidyl-4-hydrazine and 8.5 parts of α-benzoyl-butyric acid ethylester are mixed together at room temperature. After 30 minutes, the mixture is heated for 4½ hours under normal pressure and then 30 minutes at 170° under a pressure of 12 mm. Hg. After cooling, the reaction product is triturated with a small quantity of methanol and then caused to crystallize by the addition of ether. After recrystallization from benzene-petroleum ether, the obtained 1-(N-n-butyl-piperidyl-4')-3-phenyl-4-ethyl-pyrazolone-5 melts at 136–138°.

EXAMPLE 23

5.0 parts of N-isopropyl-piperidyl-4-hydrazine and 7.7 parts of α-benzoyl-butyric acid ethylester are mixed together at room temperature. After 30 minutes, the mixture is heated at 170° for five hours. The reaction mixture is then slowly cooled under a pressure of 12 mm. Hg and then distilled under the said pressure, whereby the formed pyrazolone derivative passes over at 160° to 181° under a pressure of 0.01 mm. Hg. The desired 1 - (N - isopropyl - piperidyl - 4') - 3 - phenyl-4-ethyl-pyrazolone-5 is crystallized out of isopropanol-petroleum ether and melts at 140–142° after repeated recrystallization from isopropanol-petroleum ether.

EXAMPLE 24

A mixture of 9.1 parts of N-methyl-piperidyl-4-hydrazine and 16.4 parts of α-(phenyl-acetyl)-butyric acid ethylester is heated first on the water-bath for 30 minutes, and then at a temperature of 120° and a pressure of 12 mm. Hg for 1½ hours. The reaction mixture is then distilled under a pressure of 0.01 mm. Hg whereupon the principal fraction goes over as a yellow-colored viscous oil at a bath temperature of 180–210°. This distillate is dissolved in 27.5 parts by volume of 2.05-normal aqueous hydrobromic acid, the resultant solution evaporated, and the obtained crystalline residue recrystallized twice from ethanol. The crystalline product is the 1-(N-methyl-piperidyl-4')-3-benzyl-4-ethyl-pyrazolone-5hydrobromidehydrate; melting point 165–170° (decomposition).

EXAMPLE 25

A solution of 10.0 parts of (3-nitro-benzyl)-acetic acid ethylester in 4 parts by volume of benzene is added at room temperature to 5.2 parts of N-methyl-piperidyl-4-hydrazine. The mixture warms up slowly on standing until, after 15 minutes, a vigorous reaction takes place. For completion of the reaction, the reaction mixture is heated to 100° for one more hour. The crystalline reaction mass—the 1-(N-methyl-piperidyl-4')-3-(3'-nitrophenyl)-pyrazolone-5—is then triturated with ether, filtered and recrystallized from ethanol; melting point=191–193° (decomposition).

EXAMPLE 26

12.0 parts of (4-chloro-benzoyl) acetic acid ethylester and 6.5 parts of N-methyl-piperidyl-4-hydrazine are mixed together at room temperature, whereupon a reaction takes place at once with evolution of heat. At the end of 30 minutes, the reaction mixture is heated 2 more hours at 130° under reduced pressure (about 12 mm. Hg) in order to bring the reaction to completion. After cooling, the solidified reaction mass is triturated with ether, filtered and the filter residue—the 1-(N-methyl-piperidyl-4')-3-(4'-chlorophenyl)-pyrazolone-5—recrystallized several times from isopropanol; melting point 205–207° (decomposition).

EXAMPLE 27

5.2 parts of N-methyl-piperidyl-4-hydrazine are added at room temperature to a solution of 10 parts of (4-nitro-benzoyl)-acetic acid ethylester in 4 parts by volume of benzene. The mixture warms up slowly on standing and after several minutes a vigorous reaction ensues with evolution of heat. To complete the reaction, the reaction mixture is heated for one more hour at 100°. After cooling, the crystalline red mass—1-(N-methyl-piperidyl-4')-3-(4'-nitrophenyl)-pyrazolone-5—is triturated with ether, filtered off, and recrystallized from water, ethanol or methanol. The compound is very difficultly soluble in all organic solvents and in water; melting point=220–222° (decomposition).

EXAMPLE 28

6.2 parts of p-toluyl-acetic acid ethylester and 3.8 parts of N-methyl-piperidyl-4-hydrazine are mixed together at room temperature, whereupon reaction takes place with considerable liberation of heat. The reaction mixture is allowed to stand at room temperature for 15 hours, after which it is heated to 100° for 60 minutes, being then maintained for a further hour at 110° under reduced pressure (12 mm. Hg). After cooling, the rubber-like residue is triturated with warm ether. Decantation is effected, and the 1-(N-methyl-piperidyl-4')-3-(4'-tolyl)-pyrazolone-5 is crystallized out of isopropanol. After two more recrystallizations from isopropanol or ethanol, the 1-(N-methyl-piperidyl-4')-3-(4'-tolyl)-pyrazolone-5 melts at 158–160° (decomposition).

EXAMPLE 29

A mixture of 11.6 parts of α-benzoyl-allylacetic acid ethylester and 6.5 parts of N-methyl-piperidyl-4-hydrazine is allowed to stand for 3 hours at room temperature, slight warming taking place. The mixture is then heated to 100° for 2 hours, and then kept at 110° for two more hours under a pressure of 12 mm. Hg. After cooling, the reaction mixture is taken up in a small quantity of ether while warming gently. Upon standing in the cold for a short time, 1-(N-methyl-piperidyl-4')-3-phenyl-4-allyl-pyrazolone-5 separates out in crystalline form. It is filtered off and recrystallized from isopropanol; melting point=129–131° (decomposition).

EXAMPLE 30

6.0 parts of N-methyl-piperidyl-4-hydrazine are added at room temperature to a suspension of 8.2 parts of benzoylacetic acid in 5 parts by volume of benzene. The mixture warms up slightly on standing. After 30 minutes, the reaction mixture is heated to 100° and, after an hour, for another 60 minutes at the same temperature under reduced pressure (12 mm. Hg). After cooling, the reaction mixture is triturated with ether, filtered off, and the red filter residue recrystallized from ethanol. After several recrystallizations from ethanol, the obtained 1-(N-methyl-piperidyl-4')-3-phenyl-pyrazolone-5 has a melting point of 217–219° (decomposition). The mixed melting point test with a product prepared from benzoylacetic acid ethylester and N-methyl-piperidyl-4-hydrazine, shows no depression.

EXAMPLE 31

3.5 parts of benzoylacetic acid amide in 3 parts by volume of chloroform and 2.8 parts of N-methyl-piperidyl-4-hydrazine are admixed and allowed to stand at room temperature for 30 minutes. The mixture is then heated at 100° for 45 minutes, whereupon in a few minutes reaction takes place with evolution of ammonia. To complete the reaction, the mixture is then heated for another 30 minutes to 130°. After cooling, the reaction mixture is triturated with ether, filtered off, and the filter residue recrystallized from ethanol. The obtained 1-(N-methyl-piperidyl-4')-3-phenyl-pyrazolone-5 melts at 218–220° (decomposition) and in a mixed melting point test with a product prepared from N-methyl-piperidyl-4-hydrazine and benzoylacetic acid ethylester, shows no depression.

EXAMPLE 32

Reaction of 2.8 parts of N-methyl-piperidyl-4-hydrazine with 4.5 parts of benzoylacetic acid anilide in 3 parts by volume of chloroform in accordance with the prescriptions of the preceding example yields 1-(N-methyl-piperidyl-4')-3-phenyl-pyrazolone-5 which melts at 218–220° (with decomposition) and shows no depression in a mixed melting point test with a product prepared from N-methyl-piperidyl-4-hydrazine and benzoylacetic acid ethylester.

EXAMPLE 33

6.7 parts of N-methyl-piperidyl-4-hydrazine and 11.9 parts of α-(prop-2'-ynyl)-benzoyl acetic acid-ethylester are admixed and then allowed to stand for ½ hour at room temperature. The mixture is then heated to 80° for 1 hour, then at 110° for 2 hours, after which the mixture is kept at the latter temperature for another half hour under a reduced pressure (12 mm. Hg). The resultant hard, dark-brown reaction mixture is then dissolved hot in ethanol whereupon, when the mixture cools, 1-(N-methyl-piperidyl-4')-3-phenyl-4-(prop-2'-ynyl)-pyrazolone-5 separates out in crystalline form. After two recrystalizations from ethanol, the compound has a melting point of 134–136° (decomposition).

EXAMPLE 34

The 1-(N-methyl-piperidyl-4')-3-phenyl-4-(prop-2'-ynyl)-pyrazolone-5, obtained according to Example 33, is dissolved in methanol. By addition of the calculated stoichiometric quantity of naphthalene-1,5-disulfonic acid to the thus-prepared methanolic solution of the base, the naphthalene-1,5-disulfonate of 1-(N-methyl-piperidyl-4')-3-phenyl-4-(prop-2'-ynyl)-pyrazolone-5 is obtained in the form of crystals containing 2 mols of water of crystallization (mol. wt. 915.1). After recrystallization from methanol, the salt has a melting point of 180° (decomposition).

EXAMPLE 35

To a methanolic solution of 1-(N-methyl-piperidyl-4')-3-phenyl-4-(prop-2'-ynyl)-pyrazolone-5, there is added a methanolic solution of the equivalent quantity of oxalic acid. The resultant solution mixture is concentrated to a small volume and is then allowed to stand for several days until the neutral crystalline oxalate of the 1-(N-methyl-piperidyl-4')-3-phenyl-4-(prop-2'-ynyl)-pyrazolone-5 is obtained (melting point: about 140°, with decomposition).

EXAMPLE 36

2.6 parts of N-methyl-piperidyl-4-hydrazine are added to a solution of 4.0 parts of α-(prop-2'-ynyl)-benzoylacetic acid in 8 parts by volume of chloroform, after which the mixture is heated to 80° in the course of 30 minutes. The reaction mixture is then heated to 110° for 2 hours, after which it is maintained at this temperature for 30 more minutes in vacuo (12 mm. Hg). The resultant hard, dark brown reaction mass is dissolved in hot ethanol, and the solution allowed to cool slowly, whereupon the obtained 1-(N-methyl-piperidyl-4')-3-phenyl-4-(prop-2'-ynyl)-pyrazolone-5 crystallizes out. After recrystallization from ethanol, the pyrazolone derivative melts at 134–136° (decomposition).

EXAMPLE 37

2.6 parts of N-methyl-piperidyl-4-hydrazine and 5.3 parts of α-(prop-2'-ynyl)-(p-chlorobenzoyl)-acetic acid-ethylester are admixed and then allowed to stand at room temperature for ½ hour. The mixture is then heated to 80° for one hour, then to 100° for 3 hours, and thereafter to 110° at a pressure of 12 mm. Hg for another half hour. The dark brown reaction mixture is then triturated with ether and filtered, and the filter residue— 1-(N-methyl-piperidyl-4'-3-(p-chlorophenyl)-4-(prop-2'-ynyl)-pyrazolone-5—crystallized from ethanol. After two recrystallizations from ethanol, the product melts at 265–267° (decomposition).

EXAMPLE 38

2.6 parts of N-methyl-piperidyl-4-hydrazine and 4.9 parts of α-(prop-2'-ynyl)-(p-toluyl)-acetic acid-ethylester are admixed and then allowed to stand at room temperature for ½ hour. The mixture is then heated to 80° for one hour, then to 100° for 3 hours, and thereafter to 110° at a pressure of 12 mm. Hg for another half hour. The dark brown reaction mixture is then triturated with ether and filtered, and the filter residue—1-(N-methyl-piperidyl-4'-3-(p-tolyl)-4-(prop-2'-ynyl)-pyrazolone-5—crystallized from benzene-petroleum ether. After two recrystallizations from benzene-petroleum ether, the product melts at 131–134° (decomposition).

EXAMPLE 39

A solution of 10.6 parts of the 1-(N-methyl-piperidyl-4')-3-phenyl-4-ethyl-pyrazolone-5 (prepared according to Example 10) in methanol, is treated with a methanolic solution of 5.6 parts of D-tartaric acid. The methanol is removed in vacuo and the resulting residue, the tartrate of 1-(N-methyl-piperidyl-4')-3-phenyl-4-ethyl-pyrazolone-5 is crystallized by triturating with acetone. After recrystallization from methanol, the salt has a melting point of 145–147°.

It will be understood that, in the foregoing examples, reference is made more particularly to the preferred salts of the pyrazolone bases of the invention. However, these bases readily yield therapeutically-tolerable acid addition salts with a wide variety of both organic and inorganic acids. Thus, by treating the bases with an equivalent amount of an appropriate acid, as, for example, sulfuric, phosphoric, acetic, propionic, citric, tartaric, methane-sulfonic acid, etc., the corresponding sulfate, phosphate, acetate, propionate, citrate, tartrate, methanesulfonate, etc., will be formed. These salts may be used for the preparation of ampoules; in this case it is not necessary to isolate the bases in pure crystalline form, but they can be prepared by dissolving the latter in the calculated amount of the corresponding diluted acid.

The present application is a continuation-in-part of applications Serial No. 651,154, filed April 8, 1957, and Serial No. 723,151, filed March 24, 1958 (which applications have been abandoned since and in view of the filing of the present application).

Having thus disclosed the invention, what is claimed is:

1. A member selected from the group consisting of pyrazolones of the formula

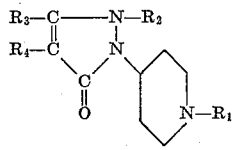

and physiologically acceptable salts thereof with acids, wherein $R_1$ is lower alkyl, $R_2$ is a member selected from the group consisting of H and lower alkyl, each of $R_3$ and $R_4$ represents a member selected from the class consisting of H, lower alkyl, lower alkenyl, lower alkynyl, phenyl, benzyl, nitrophenyl, chlorophenyl and methylphenyl, and $R_3$ and $R_4$ taken jointly represent the —$CH_2$—$CH_2$—$CH_2$— group.

2. 1-(N-lower alkyl-piperidyl-4')-3-phenyl-4-lower alkyl-pyrazolone-5.

3. 1-(N-lower alkyl-piperidyl-4')-3-phenyl-4-lower alkenyl-pyrazolone-5.

4. 1-(N-lower alkyl-piperidyl-4')-3-phenyl-4-lower alkynyl-pyrazolone-5.

5. 1-(N-methyl-piperidyl-4')-3-phenyl-4-ethyl-pyrazolone-5.

6. 1-(N-methyl-piperidyl-4')-3-phenyl-4-n-propyl-pyrazolone-5.

7. 1-(N-methyl-piperidyl-4')-3-phenyl-4-allyl-pyrazolone-5.

8. 1-(N-methyl-piperidyl-4')-3-phenyl-4-(prop-2'-ynyl)-pyrazolone-5.

No references cited.

UNITED STATES PATENT OFFICE
CERTIFICATE OF CORRECTION

Patent No. 2,903,460

September 8, 1959

Ernst Jucker et al.

It is hereby certified that error appears in the printed specification of the above numbered patent requiring correction and that the said Letters Patent should read as corrected below.

Column 6, line 1, for "methanolether" read -- methanol-ether --; line 60, for "ether" read -- ester --; column 7, line 65, for "allower" read -- allowed --; column 14, line 27, after "piperidyl-4'" insert a closing parenthesis.

Signed and sealed this 17th day of May 1960.

(SEAL)
Attest:

KARL H. AXLINE
Attesting Officer

ROBERT C. WATSON
Commissioner of Patents